F. L. SATTLEY.
PNEUMATIC STACKER.
APPLICATION FILED APR. 23, 1910.

989,296.

Patented Apr. 11, 1911.
2 SHEETS—SHEET 1.

Witnesses:
Adelaide Kearns.
Clara Dilse.

Inventor:
Frederick L. Sattley,
By James A. Walsh
Attorney

F. L. SATTLEY.
PNEUMATIC STACKER.
APPLICATION FILED APR. 23, 1910.
989,296.
Patented Apr. 11, 1911.
2 SHEETS—SHEET 2.
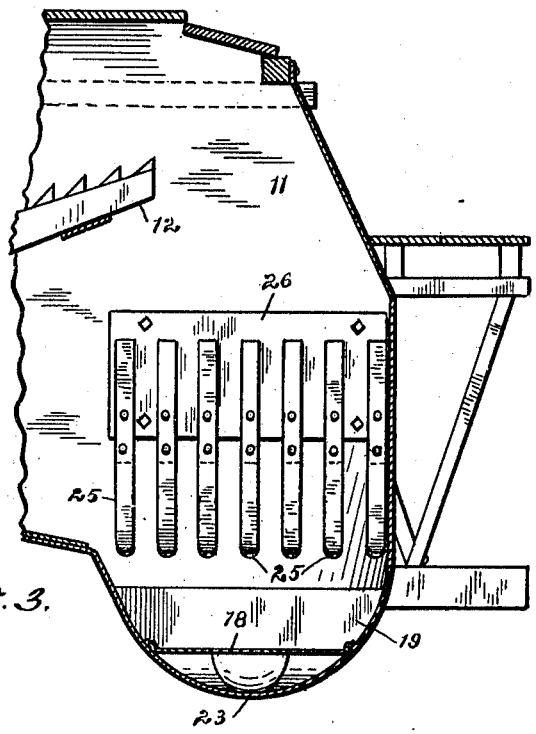
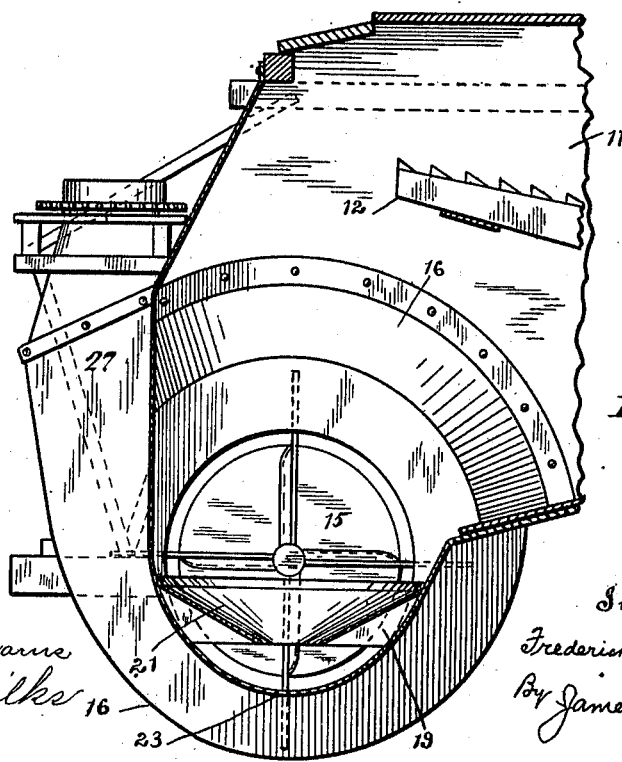

UNITED STATES PATENT OFFICE.

FREDERICK L. SATTLEY, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

PNEUMATIC STACKER.

989,296.   Specification of Letters Patent.   Patented Apr. 11, 1911.

Application filed April 23, 1910. Serial No. 557,144.

*To all whom it may concern:*

Be it known that I, FREDERICK L. SATTLEY, a citizen of the United States, residing at Indianapolis, in the county of Marion and State of Indiana, have invented certain new and useful Improvements in Pneumatic Stackers, of which the following is a specification.

My present invention relates to improvements in pneumatic stackers, and consists in certain details of construction and arrangements of parts, as will be hereinafter more fully pointed out.

Figure 1:
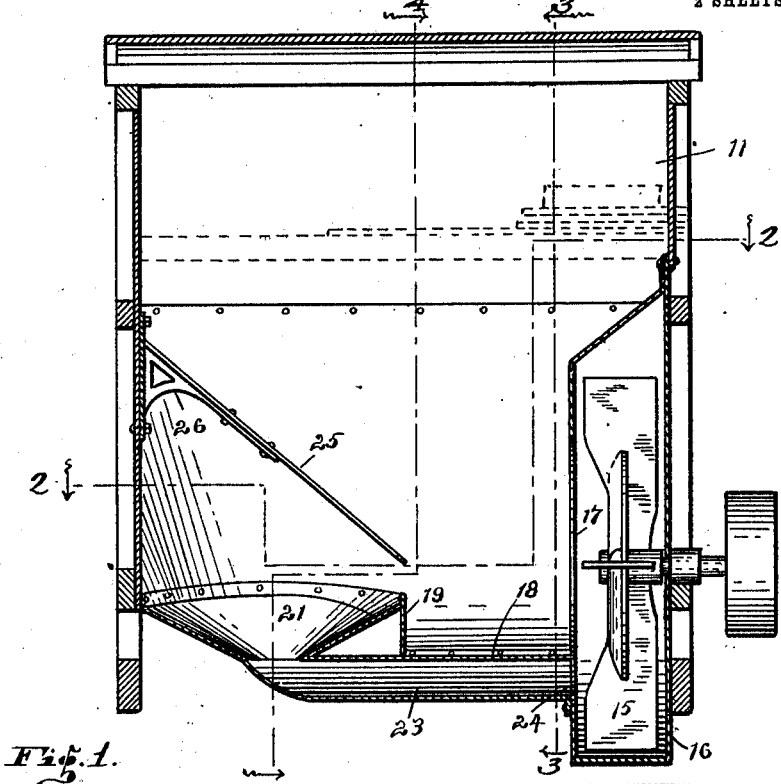
Figure 2:
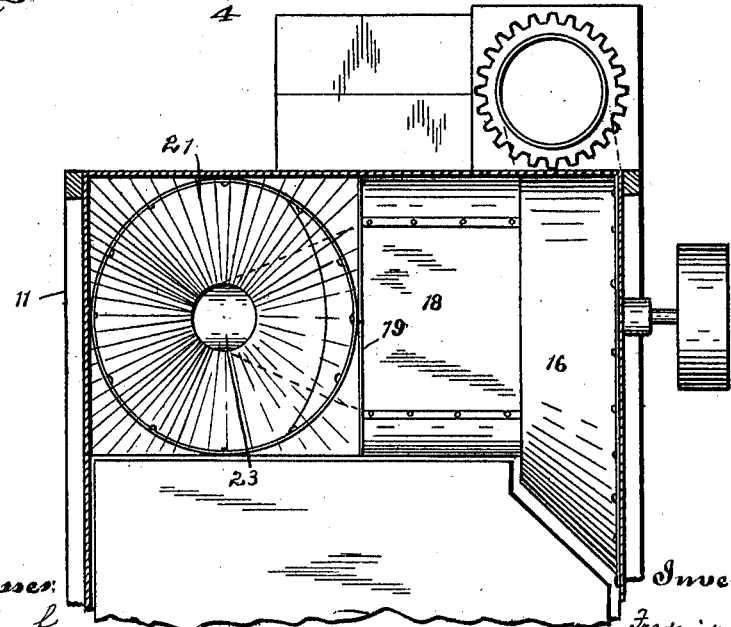

In the accompanying drawings, which are made a part hereof, Figure 1 is a transverse sectional view of the material-receiving portion of a pneumatic stacker embodying my invention; Fig. 2 a horizontal sectional view thereof looking downwardly from the dotted line 2—2 in Fig. 1; and Figs. 3 and 4 are detail views as seen from the dotted lines 3—3 and 4—4, respectively, in Fig. 1.

In said drawings, the portions marked 11 represent the casing of my improved stacker, which may be attached to a separator in any suitable manner. Said casing, as usual, forms the receiving chamber into which material is discharged from the racks 12, and other parts of the separator. At one side of said chamber I provide a fan, 15, of any suitable construction, mounted in a housing, 16, having an inlet opening 17, communicating with a comparatively short horizontally arranged hopper, 18, which terminates in a wall, 19. Adjoining said hopper 18 I also provide a bowl-shaped hopper, 21, open at its lower side and communicating with a duct, 23, leading to a second inlet, 24, in the fan housing (Fig. 1); and above said hopper 21 at the side of the receiving chamber opposite the fan I place a series of inclined deflecting slats, 25, supported by a bracket 26.

In the manner described I produce a simple and effective structure for receiving and delivering material from the separator, a considerable portion of which material, as straw, coming from the upper racks or conveyers, 12, descends directly into straw hopper 18, while that which is discharged into the chamber farthest from the fan strikes slatted deflector 25 and is thereby constantly deflected toward said hopper and into the influence of the suction intake current created by the fan; and at the same time a portion of the finer material, such as short straws, chaff, etc., discharging from the winnower in the separator flows into hopper 18 and becomes mingled with the straw and that portion thereof which discharges into the chaff hopper 21, together with the finer material sifting through the slatted deflector, is withdrawn through duct 23, through opening 24 into the fan by the suction current of the latter, and becomes mingled with the material taken from hopper 18 and discharged through the outlet or boot, 27, and from thence through the stacker chute as usual.

I claim as my invention:

1. In a pneumatic stacker, the combination of a material-receiving chamber embodying a straw hopper and a chaff hopper arranged in line with each other transversely of said chamber, a fan at one side of said chamber communicating with said straw hopper, and a duct leading from said chaff hopper beneath said straw hopper and communicating with said fan.

2. In a pneumatic stacker, the combination of a material-receiving chamber embodying a straw-receiving hopper and a chaff receiving hopper arranged in line with each other transversely of said chamber, a fan communicating with said hoppers, and a deflector above said chaff hopper and in the side of the chamber opposite to said fan for directing material toward said fan and straw hopper.

3. In a pneumatic stacker, the combination of a material-receiving chamber embodying a straw-receiving hopper and a chaff receiving hopper arranged in line with each other transversely of said chamber, a fan communicating with said hoppers, and a slatted deflector above said chaff hopper for directing material toward said fan and straw hopper.

4. In a pneumatic stacker, the combination of a material-receiving chamber embodying a horizontally-arranged hopper and a bowl-shaped chaff hopper arranged in line with each other transversely of said chamber, and a fan communicating with said hoppers for withdrawing and discharging material therefrom.

5. In a pnuematic stacker, the combination of a material-receiving chamber, a fan at one side of said chamber, a straw hopper extending partially transversely across said chamber and communicating directly with said fan, a chaff hopper adjoining said straw hopper, and a duct leading from said chaff hopper beneath said straw hopper and communicating with said fan.

6. In a pneumatic stacker, the combination of a material-receiving chamber, a chaff hopper and a straw hopper arranged in line with each other transversely of and forming the bottom of said chamber, a duct associated with said chaff hopper and a fan at one side of said chamber having an opening to receive straw directly from said straw hopper and another opening to receive chaff from said chaff hopper through said duct.

7. In a pneumatic stacker, the combination of a material-receiving chamber, a chaff hopper and a straw hopper therein arranged in line with each other transversely of said chamber, a fan at one side of said chamber and communicating with said hoppers, and a series of slats at the side of said chamber opposite to said fan for deflecting material toward said fan.

8. In a pneumatic stacker, the combination of a straw receiving chamber, a chaff hopper and a straw hopper in the bottom thereof; a fan having openings to receive material from said hoppers, and a series of slats at the side of said chamber opposite said fan through which fine material is sifted to the chaff hopper and by which straw is deflected toward said fan.

9. In a pneumatic stacker, the combination of a straw-receiving chamber, two hoppers arranged in line with each other in the lower end and transversely of said chamber and divided from each other and each communicating with said fan through separate openings in its casing, and a slatted deflector above said hoppers for directing material toward said fan.

In testimony whereof I affix my signature in presence of two witnesses

FREDERICK L. SATTLEY.

Witnesses:
C. E. SLOAN,
LEE R. GARBER.

---

Copies of this patent may be obtained for five cents each, by addressing the "Commissioner of Patents, Washington, D. C."